United States Patent
Gholmieh et al.

(10) Patent No.: US 8,184,599 B2
(45) Date of Patent: May 22, 2012

(54) MANAGEMENT OF UE OPERATION IN A MULTI-CARRIER COMMUNICATION SYSTEM

(75) Inventors: Aziz Gholmieh, Del Mar, CA (US); Bibhu P. Mohanty, San Diego, CA (US); Danlu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 104 days.

(21) Appl. No.: 12/488,792

(22) Filed: Jun. 22, 2009

(65) Prior Publication Data

US 2009/0316575 A1 Dec. 24, 2009

Related U.S. Application Data

(60) Provisional application No. 61/074,962, filed on Jun. 23, 2008.

(51) Int. Cl.
*H04B 7/216* (2006.01)
(52) U.S. Cl. .................................. 370/335; 370/342
(58) Field of Classification Search .......... 370/328–339, 370/465
See application file for complete search history.

(56) References Cited

U.S. PATENT DOCUMENTS

| | | | |
|---|---|---|---|
| 2003/0174643 A1 | 9/2003 | Ro et al. | |
| 2004/0062192 A1 | 4/2004 | Liu et al. | |
| 2006/0274712 A1 | 12/2006 | Malladi et al. | |
| 2007/0091817 A1 | 4/2007 | Yoon et al. | |
| 2007/0133479 A1* | 6/2007 | Montojo et al. | 370/335 |
| 2008/0144593 A1* | 6/2008 | Tseng | 370/342 |
| 2009/0296643 A1* | 12/2009 | Cave et al. | 370/329 |

FOREIGN PATENT DOCUMENTS

| | | |
|---|---|---|
| RU | 2265280 | 11/2005 |
| WO | WO 03079593 A1 | 9/2003 |
| WO | WO 2005048616 A1 | 5/2005 |
| WO | 2006/125149 A2 | 11/2006 |
| WO | WO 2007090459 A1 | 8/2007 |
| WO | 2008/069950 A2 | 6/2008 |

OTHER PUBLICATIONS

"Dual-Cell HSDPA Operation on Adjacent Carriers", 3GPP TSG RAN #40, RP-080490, May 27-30, 2008, Prague, Czech Republic.
"3rd Generation Partnership Project; Technical Specification Group Radio Access Network; Multiplexing and channel coding (FDD)", (Release 8), 3GPP TS 25.212 V8.5.0 (Mar. 2009).
Eiko Seidel: "Technology of high speed packet access (HSPA)" Nomor Research, [Online] Oct. 1, 2006, pp. 1-5, XP002552313 Retrieved from the Internet: URL:www.nomor.de/uploads/b0/2m/ .../Technology_of_HSPA.pdf>.

(Continued)

*Primary Examiner* — Frank Duong
(74) *Attorney, Agent, or Firm* — D. Scott Juneau

(57) ABSTRACT

Techniques for managing operation of a user equipment (UE) in a multi-carrier system are described. The system may support two or more carriers on the downlink and one or more carriers on the uplink. One carrier on each link may be designated as an anchor carrier. In an aspect, a lower layer order (e.g., an HS-SCCH order) may be used to transition the UE between single-carrier and multi-carrier operation. In another aspect, the UE may have the same discontinuous reception (DRX) configuration for all downlink carriers and/or the same discontinuous transmission (DTX) configuration for all uplink carriers. In yet another aspect, HS-SCCH-less operation may be restricted to the anchor carrier.

30 Claims, 7 Drawing Sheets

OTHER PUBLICATIONS

Ericsson et al: "Text Proposal for DC-HSDPA assumptions and standards impact" 3GPP Draft; RI-082249 Text Proposal for DC-HSDPA Assumptions and Standards Impact, 3RD Generation Partnership Project (3GPP), Competence Centre ; 650, Route Des Lucioles ; F-06921 Sophia-Antipolis Cedex ; France, vol. RAN WGI, No. Kansas City, USA; May 23, 2008, XP050110541.

Ericsson: "Considerations on Dual-Cell Hsdpa Operation"3GPP Draft; RI-081545, 3RD Generation Partnership Project (3GPP), Mobile Competence Centre ; 650, Route Des Lucioles ; F-06921 Sophia-Antipolis Cedex ; France, vol. RAN W61, No. Shenzhen, China; Mar. 27, 2008 XP050109958.

International Search Report and Written Opinion, PCT/US2009/048277, ISA, European Patent Office, Feb. 10, 2010.

Ericsson: "Considerations on Dual-Cell HSDPA Operation" 3GPP Draft; R1-081545, 3RD Generation Partnership Project (3GPP), Mobile Competence Centre ; 650, Route Des Lucioles ; F-06921 Sophia-Antipolis Cedex ; France, vol. RAN WG1, No. Shenzhen, China; Mar. 27, 2008, XP050109958 [retrieved on Mar. 27, 2008] the whole document.

International Search Report and Written Opinion—PCT/US2009/048277—ISA/EPO—Feb. 10, 2010.

European Search Report—EP11159666—Search Authority—Munich—Jun. 14, 2011.

\* cited by examiner

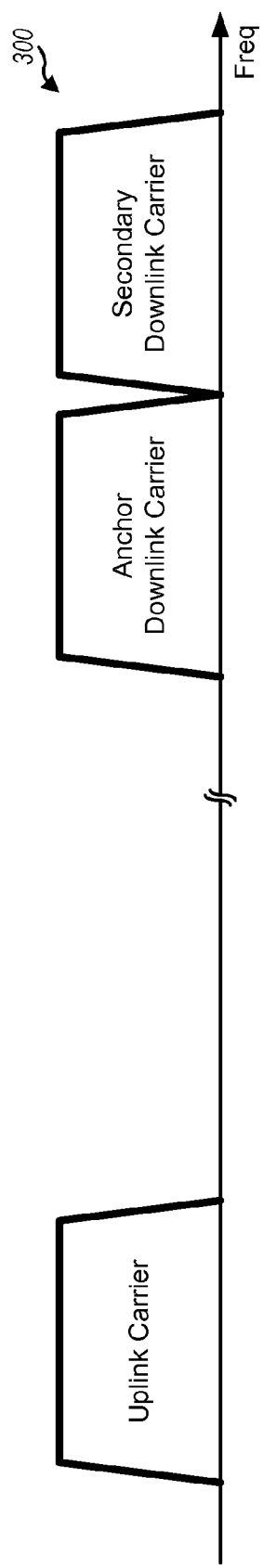
FIG. 3A
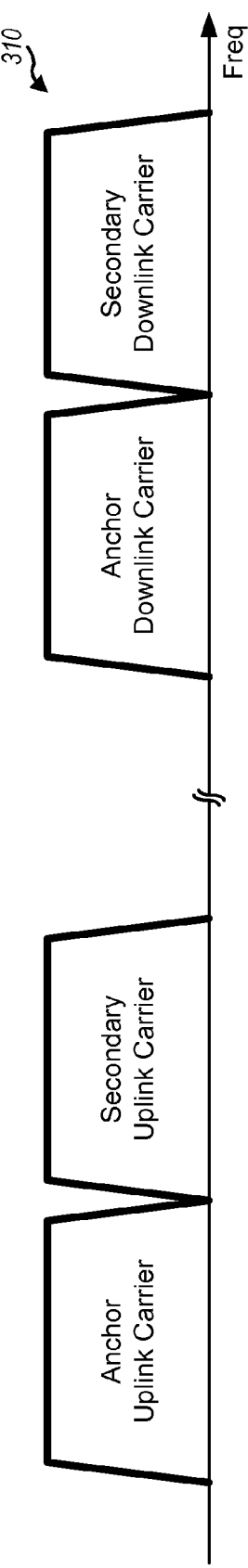
FIG. 3B
HS-SCCH Order for Single-Carrier/Dual-Carrier Operation
| Order Type :<br>e.g., set to '001' | Order : 1 bit set to<br>'0' = single-carrier<br>'1' = dual-carrier | UE Identity |
FIG. 5

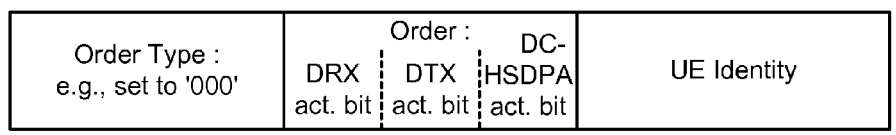
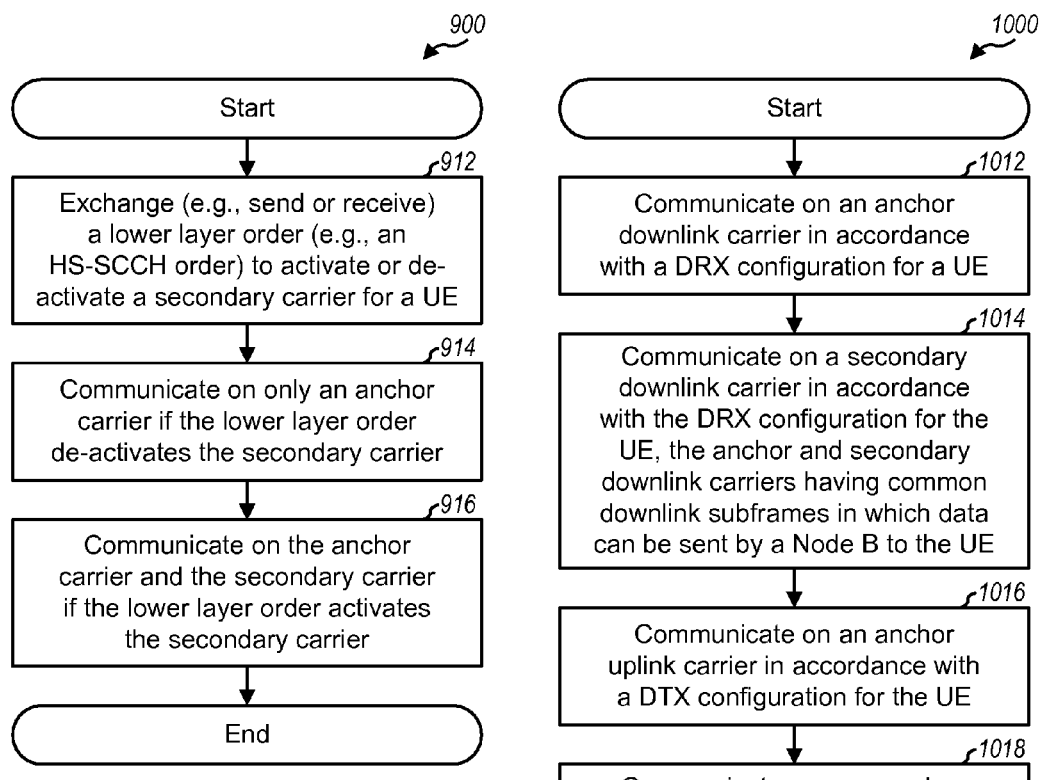

MANAGEMENT OF UE OPERATION IN A MULTI-CARRIER COMMUNICATION SYSTEM

CLAIM OF PRIORITY UNDER 35 U.S.C. §119

The present Application for Patent claims priority to Provisional U.S. Application Ser. No. 61/074,962, entitled "METHODS AND APPARATUSES FOR OPERATING DISCONTINUOUS TRANSMISSION AND RECEPTION (DTX/DRX) IN DUAL CARRIER MODE," filed Jun. 23, 2008, assigned to the assignee hereof, and expressly incorporated herein by reference.

BACKGROUND

I. Field

The present disclosure relates generally to communication, and more specifically to techniques for managing operation of a user equipment (UE) in a wireless communication system.

II. Background

Wireless communication systems are widely deployed to provide various communication services such as voice, video, packet data, messaging, broadcast, etc. These systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may be a multi-carrier system that supports communication on multiple carriers in order to increase system capacity. Each carrier may have a specific center frequency and a specific bandwidth and may be used to send traffic data, control information, pilot, etc. It is desirable to support operation on the multiple carriers such that good performance can be achieved.

SUMMARY

Techniques for managing operation of a UE in a multi-carrier system are described herein. The system may support two or more carriers on the downlink. One downlink carrier may be designated as an anchor downlink carrier, and each remaining downlink carrier may be referred to as a secondary downlink carrier. The system may also support one or more carriers on the uplink. One uplink carrier may be designated as an anchor uplink carrier, and each remaining uplink carrier (if any) may be referred to as a secondary uplink carrier.

In an aspect, a lower layer order may be used to transition the UE between single-carrier and multi-carrier operation. The lower layer order may be lower layer signaling that may be sent more quickly and efficiently than upper layer signaling. For example, the lower layer order may be a Shared Control Channel for HS-DSCH (HS-SCCH) order in Wideband CDMA (WCDMA). In one design, the UE may receive a lower layer order to activate or de-activate a secondary carrier for the downlink and/or uplink from a Node B. The UE may communicate with the Node B (i) on only the anchor carrier if the lower layer order de-activates the secondary carrier or (ii) on both the anchor and secondary carriers if the lower layer order activates the secondary carrier.

In another aspect, the UE may have the same discontinuous reception (DRX) configuration for all downlink carriers and/or the same discontinuous transmission (DTX) configuration for all uplink carriers. The UE may receive data from the Node B on one or more downlink carriers in enabled downlink subframes, which may be determined based on the DRX configuration. The UE may send data to the Node B on one or more uplink carriers in enabled uplink subframes, which may be determined based on the DTX configuration.

In yet another aspect, HS-SCCH-less operation may be restricted to the anchor downlink carrier. The UE may be configured for HS-SCCH-less operation and may be assigned one or more transmission parameters. The Node B may send data on the anchor downlink carrier to the UE and may send no signaling along with the data. The UE may process the anchor downlink carrier in accordance with the assigned transmission parameter(s) to recover the data sent by the Node B.

Various aspects and features of the disclosure are described in further detail below.

BRIEF DESCRIPTION OF THE DRAWINGS

FIGS. 3A and 3B show two multi-carrier configurations.

FIG. 5 shows an HS-SCCH order to enable single-carrier or dual-carrier operation.

FIG. 8 shows an HS-SCCH order to enable single-carrier or dual-carrier operation and to activate or de-activate DRX/DTX.

FIG. 9 shows a process for supporting multi-carrier operation.

FIG. 10 shows a process for supporting DRX/DTX operation.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes WCDMA and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies. For clarity, certain aspects of the techniques are described below for WCDMA, and 3GPP terminology is used in much of the description below.

Figure 1:
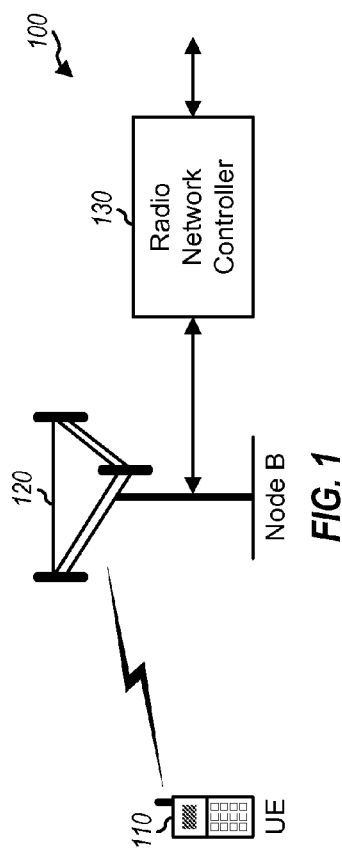
FIG. 1 shows a wireless communication system.

FIG. 1 shows a wireless communication system 100, which may include a number of Node Bs and other network entities. For simplicity, only one Node B 120 and one Radio Network Controller (RNC) 130 are shown in FIG. 1. A Node B may be a station that communicates with the UEs and may also be referred to as an evolved Node B (eNB), a base station, an access point, etc. A Node B may provide communication coverage for a particular geographic area. To improve system capacity, the overall coverage area of a Node B may be partitioned into multiple (e.g., three) smaller areas. Each smaller area may be served by a respective Node B subsystem. In 3GPP, the term "cell" can refer to a coverage area of a Node B and/or a Node B subsystem serving the coverage area. RNC 130 may couple to a set of Node Bs and provide coordination and control for these Node Bs.

A UE 110 may be stationary or mobile and may also be referred to as a mobile station, a terminal, an access terminal, a subscriber unit, a station, etc. UE 110 may be a cellular phone, a personal digital assistant (PDA), a wireless modem, a wireless communication device, a handheld device, a laptop computer, a cordless phone, a wireless local loop (WLL) station, etc. UE 110 may communicate with Node B 120 via the downlink and uplink. The downlink (or forward link) refers to the communication link from the Node B to the UE, and the uplink (or reverse link) refers to the communication link from the UE to the Node B.

Figure 2:
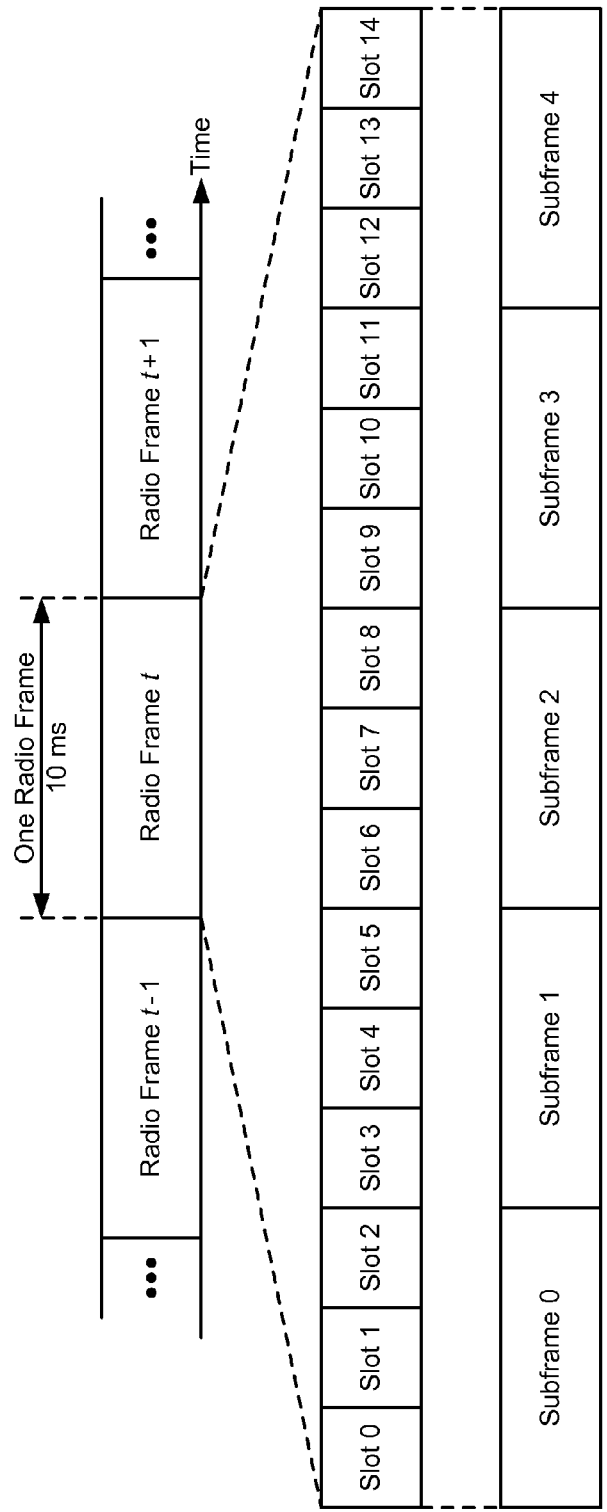
FIG. 2 shows a frame format in WCDMA.

FIG. 2 shows a frame format in WCDMA. The transmission timeline for each link is divided into radio frames. Each radio frame has a duration of 10 milliseconds (ms) and is partitioned into 15 slots 0 through 14. Each slot has a duration of $T_{slot}=0.667$ ms and includes 2560 chips at 3.84 Mcps. Each radio frame is also partitioned into five subframes 0 through 4. Each subframe has a duration of 2 ms and includes 3 slots.

3GPP supports High-Speed Packet Access (HSPA), which includes High-Speed Downlink Packet Access (HSDPA) defined in 3GPP Release 5 and later as well as High-Speed Uplink Packet Access (HSUPA) defined in 3GPP Release 6 and later. HSDPA and HSUPA are sets of channels and procedures that enable high-speed packet data transmission on the downlink and uplink, respectively. For HSDPA, the Node B may send data on a High Speed Downlink Shared Channel (HS-DSCH), which is a downlink transport channel that is shared by UEs in both time and code. The HS-DSCH may carry data for one or more UEs in each transmission time interval (TTI). The sharing of the HS-DSCH may be dynamic and may change from TTI to TTI.

3GPP also supports Dual-Cell HSDPA (DC-HSDPA). For DC-HSDPA, up to two cells of the Node B may send data to the UE in a given TTI. The two cells may operate on different carriers. The terms "cells" and "carriers" may thus be used interchangeably with regard to DC-HSDPA.

FIG. 3A shows an exemplary multi-carrier configuration 300 that may be used for DC-HSDPA. In this configuration, two carriers are available on the downlink and are referred to as downlink carriers, and one carrier is available on the uplink and is referred to as an uplink carrier. One downlink carrier may be designated as an anchor downlink carrier or a primary downlink carrier. The other downlink carrier may be referred to as a secondary downlink carrier, a supplemental downlink carrier, an auxiliary downlink carrier, etc. The anchor downlink carrier may carry certain signaling and may support certain operating modes, as described below. The secondary downlink carrier may be activated to support a higher data rate and may be de-activated when not needed.

FIG. 3B shows an exemplary multi-carrier configuration 310 that may also be used for DC-HSDPA. In this configuration, two carriers are available on the downlink, and two carriers are available on the uplink. One downlink carrier may be designated as an anchor downlink carrier, and the other downlink carrier may be referred to as a secondary downlink carrier. Similarly, one uplink carrier may be designated as an anchor uplink carrier, and the other uplink carrier may be referred to as a secondary uplink carrier. The anchor carriers may carry certain signaling and may support certain operating modes, as described below. The secondary carriers may be activated to support a higher data rate and may be de-activated when not needed.

FIGS. 3A and 3B show two exemplary multi-carrier configurations for DC-HSDPA. In general, any number of carriers may be available for the downlink, and any number of carriers may be available for the uplink. One downlink carrier may be designated as an anchor downlink carrier, and the remaining downlink carriers may be referred to as secondary downlink carriers. Similarly, one uplink carrier may be designated as an anchor uplink carrier, and the remaining uplink carriers (if any) may be referred to as secondary uplink carriers. For clarity, much of the description below is for the multi-carrier configurations shown in FIGS. 3A and 3B. In the description below, an anchor carrier may be an anchor downlink carrier or an anchor uplink carrier. A secondary carrier may be an secondary downlink carrier or a secondary uplink carrier.

Table 2 lists some physical channels used for HSDPA, HSUPA and DC-HSDPA.

TABLE 1

| | Channel | Channel Name | Description |
| --- | --- | --- | --- |
| HSDPA | P-CCPCH (Downlink) | Primary Common Control Physical Channel | Carry pilot and system frame number (SFN) |
| | HS-SCCH (Downlink) | Shared Control Channel for HS-DSCH | Carry signaling for packets sent on the HS-PDSCH |
| | HS-PDSCH (Downlink) | High Speed Physical Downlink Shared Channel | Carry packets sent on the downlink for different UEs |
| | HS-DPCCH (Uplink) | Dedicated Physical Control Channel for HS-DSCH | Carry ACK/NAK for packets sent on the HS-PDSCH and CQI |
| HSUPA | E-DPCCH (Uplink) | E-DCH Dedicated Physical Control Channel | Carry signaling for the E-DPDCH |
| | E-DPDCH (Uplink) | E-DCH Dedicated Physical Data Channel | Carry packets sent on the uplink by a UE |
| | E-HICH (Downlink) | E-DCH Hybrid ARQ Indicator Channel | Carry ACK/NAK for packets sent on the E-DPDCH |

Figure 4:
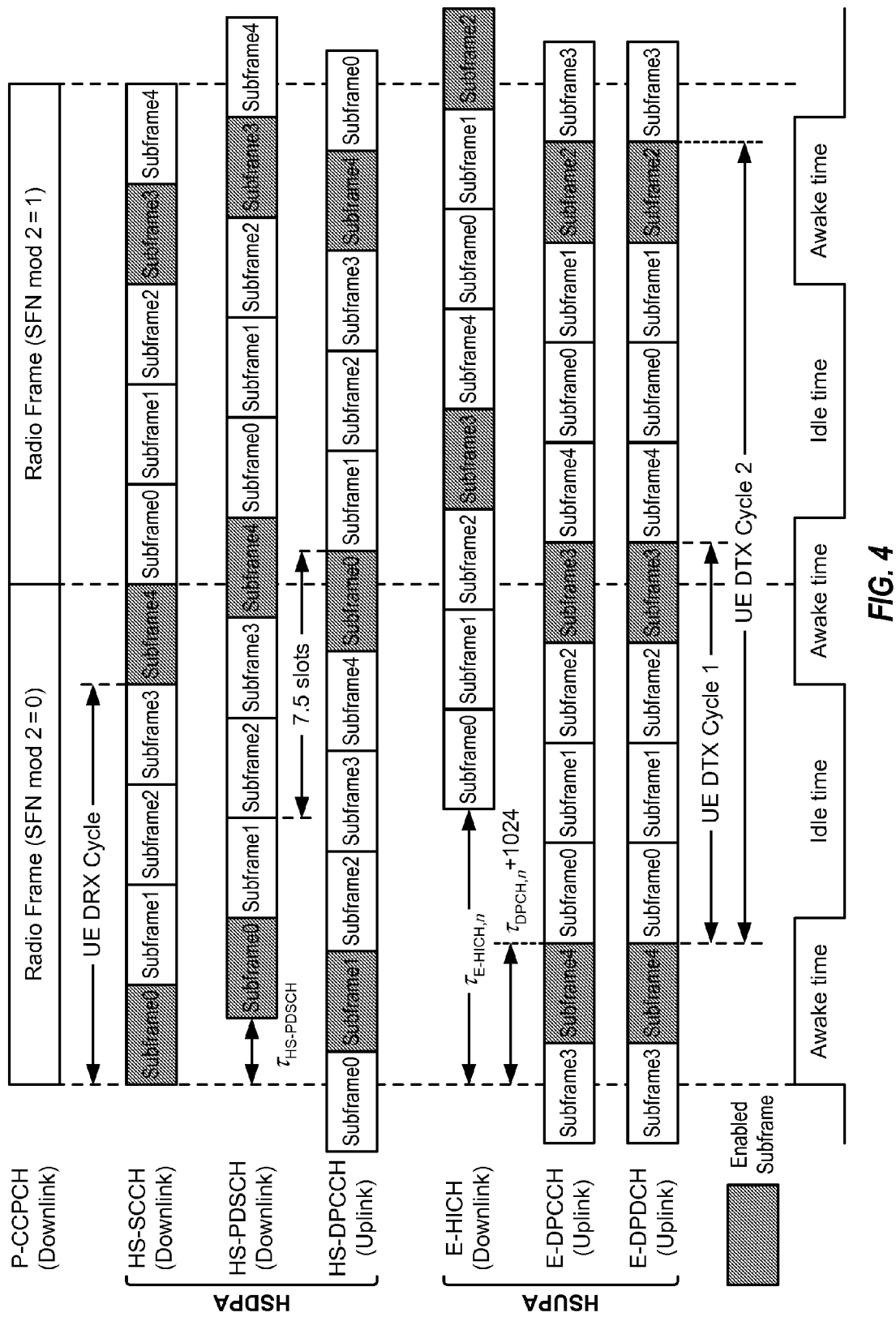
FIG. 4 shows a timing diagram for some physical channels in WCDMA.

FIG. 4 shows a timing diagram of some physical channels used for HSDPA and HSUPA. The P-CCPCH is used directly as timing reference for the downlink physical channels and is used indirectly as timing reference for the uplink physical channels. For HSDPA, the subframes of the HS-SCCH are time-aligned with the P-CCPCH. The subframes of the HS-PDSCH are delayed by $\tau_{HS\text{-}PDSCH}=2T_{slot}$ from the subframes of the HS-SCCH. The subframes of the HS-DPCCH are delayed by 7.5 slots from the subframes of the HS-PDSCH. For HSUPA, the frame timing of the E-HICH is offset by $\tau_{E\text{-}HICH,n}$ chips from the frame timing of the P-CCPCH, where $\tau_{E\text{-}HICH,n}$ is defined in 3GPP TS 25.211. The E-DPCCH and E-DPDCH are time-aligned and their frame timing is offset by $\tau_{DPCH,n}+1024$ chips from the frame timing of the P-CCPCH, where $\tau_{DPCH,n}=256\,n$ and n can range from 0 to 149. The frame timing of the downlink and uplink physical channels is described in 3GPP TS 25.211. For simplicity, other physical channels such as grant channels are not shown in FIG. 4.

In an aspect, an HS-SCCH order may be used to transition the UE between single-carrier and dual-carrier operation. HS-SCCH orders are lower layer signaling that may be sent more quickly and efficiently than upper layer signaling. For example, an HS-SCCH order may be sent in 2 ms with few or tens of bits, whereas an upper layer message may take much longer and may include many more bits. Lower layer may refer to physical layer (PHY), Medium Access Control (MAC) layer, etc. Lower layer may be different from upper layer, which may refer to Radio Resource Control (RRC), etc. The lower layer and upper layer may be terminated at different entities in the system. For example, in WCDMA, PHY and MAC may be terminated at the Node B in whereas RRC may be terminated at the RNC.

HS-SCCH orders may be used to quickly transition the UE between single-carrier and dual-carrier operation. The UE may operate on only the anchor downlink carrier and the anchor uplink carrier for single-carrier operation. The UE may operate on all downlink carriers and all uplink carriers for dual-carrier operation. For example, the Node B may quickly transition the UE to dual-carrier operation whenever the Node B has a large amount of data to send to the UE and may quickly transition the UE to single-carrier operation after sending the data.

FIG. 5 shows a design of an HS-SCCH order 500 that may be used to quickly transition the UE between single-carrier and dual-carrier operation. HS-SCCH order 500 may be sent on the HS-SCCH and may include a 3-bit order type field, a 3-bit order field, a 16-bit UE identity field, and possibly other fields. The order type field may be set to a predetermined value (e.g., '001') to indicate that the HS-SCCH order is for activation and deactivation of the secondary downlink carrier and the secondary uplink carrier (if any). The secondary carrier(s) may also be referred to as a secondary serving HS-DSCH cell. The order field may include a designated bit that may be set to (i) a first value (e.g., '1') to indicate that the secondary carrier(s) are activated and dual-carrier operation is enabled or (ii) a second value (e.g., '0') to indicate that the secondary carrier(s) are de-activated and single-carrier operation is enabled. An HS-SCCH order for activating/de-activating the secondary carrier(s) may also be defined in other manners.

The ability to activate and deactivate the secondary carrier(s) in DC-HSDPA may be beneficial for the following reasons:
 1. Revert to single-carrier operation when the UE is power limited,
 2. Power savings at the UE,
 3. Free unused resources in the system, which may help admission control, and
 4. Load control.

The amount of transmit power required by the UE for data transmission on the uplink may be dependent on the data rate and the uplink channel conditions. The UE may be power limited if the required transmit power exceeds the maximum transmit power at the UE. This may occur if the data rate is sufficiently high and/or the uplink channel quality is sufficiently poor. The UE may become power limited even when it is not at the coverage edge of the Node B. Conversely, the UE may not be power limited when it is at the coverage edge. A power limited scenario may result from channel conditions that can change faster than the RNC can react but may be slow enough to be manageable at the Node B. By quickly reverting to single-carrier operation when the UE is power limited, the required transmit power may be reduced below the maximum transmit power, and the power limited scenario may be averted.

The UE may process more downlink channels on two downlink carriers in dual-carrier operation and may thus consume more battery power in dual-carrier operation than in single-carrier operation. The UE may transition to single-carrier operation when data activity is slow in order to save battery power. The RNC may send a small RRC control message to transition the UE between single-carrier and dual-carrier operation. However, the load at the RNC may be large due to burstiness of data traffic and a large number of UEs being handled by the RNC. On the other hand, having the Node B control transition between single-carrier and dual-carrier operation of the UE may not add a significant processing load at the Node B.

The first two objectives noted above, and possibly other objectives, may be better achieved by having the Node B (instead of the RNC) control single-carrier and multi-carrier operation of the UE. The Node B may send HS-SCCH orders to quickly turn on and off DC-HSDPA and transition the UE between single-carrier and dual-carrier operation. The last two objectives noted above may be achieved by a slow management entity at the RNC and using RRC control messages. The RNC may send small RRC control messages (instead of full RRC Reconfiguration messages) to turn on and off DC-HSDPA for the UE. Control of UE operation by the Node B may be referred to as MAC-based management. Control of UE operation by the RNC may be referred to as RRC-based management.

3GPP Release 7 and later supports Continuous Packet Connectivity (CPC), which allows the UE to operate with DRX and/or DTX in order to conserve battery power. For DRX, the UE may be assigned certain enabled downlink subframes in which the Node B can send data to the UE. The enabled downlink subframes may also be referred to as DRX opportunities. For DTX, the UE may be assigned certain enabled uplink subframes in which the UE can send data to the Node B. The enabled uplink subframes may also be referred to as DTX bursts. The UE may receive signaling and/or data in the enabled downlink subframes and may send signaling and/or data in the enabled uplink subframes. The UE may power down during the idle times between the enabled subframes to conserve battery power. CPC is described in 3GPP TR 25.903, entitled "Continuous Connectivity for Packet Data Users," March 2007, which is publicly available.

FIG. 4 also shows exemplary configurations of DRX and DTX for the UE in CPC. For DRX, the enabled downlink subframes may be defined by an HS-SCCH reception pattern. For DTX, the enabled uplink subframes may be defined by an uplink DPCCH burst pattern. In the example shown in FIG. 4, the UE is configured as follows:
 UE DTX cycle 1=UE DRX cycle=4 subframes,
 UE DTX cycle 2=8 subframes, and
 UE DPCCH burst 1=UE DPCCH burst 2=1 subframe.

For the DRX and DTX configurations given above, the enabled downlink subframes for HSDPA are spaced apart by four subframes and are shown with gray shading near the top of FIG. 4. The enabled uplink subframes for HSUPA are also spaced apart by four subframes and are also shown with gray shading near the middle of FIG. 4. The alignment of the enabled downlink subframes and the enabled uplink subframes is dependent on $\tau_{DPCH,n}$. The enabled downlink and uplink subframes may be aligned in time in order to extend possible sleep time for the UE. As shown in FIG. 4, the UE may be awake during the enabled subframes and may go to sleep during the idle times between the enabled subframes. FIG. 4 assumes that the UE does not transmit data on the uplink and hence does not need to monitor the E-HICH for ACK/NAK.

In another aspect, DRX/DTX operations for the UE may be the same for both carriers on each link and may observe the same timing. For DRX, the UE may have a particular DRX configuration (e.g., a particular HS-SCCH reception pattern) for the anchor downlink carrier. The same DRX configuration may be applicable for the secondary downlink carrier. The UE would then have the same DRX configuration for both downlink carriers. The UE may receive data on only the anchor downlink carrier or both downlink carriers in the enabled downlink subframes.

For DTX, the UE may have a particular DTX configuration (e.g., a particular uplink DPCCH burst pattern) for the anchor uplink carrier. The same DTX configuration may be applicable for the secondary uplink carrier, if present. The UE would then have the same DTX configuration for both uplink carriers. The UE may send data on only the anchor uplink carrier or both uplink carriers in the enabled uplink subframes. If only one uplink carrier is available, then the DTX configuration would apply to only this one uplink carrier.

The Node B may send a DTX order to the UE to activate or de-activate DTX operation for the UE. In one design, the Node B may send the DTX order on either the anchor or secondary downlink carrier. In another design, the Node B may send the DTX order on only the anchor downlink carrier. For both designs, the DTX order may be applicable for DTX operation on all uplink carriers by the UE.

The Node B may send a DRX order to the UE to activate or de-activate DRX operation for the UE. In one design, the Node B may send the DRX order on either the anchor or secondary downlink carrier. In another design, the Node B may send the DRX order on only the anchor downlink carrier. For both designs, the DRX order may be applicable for DRX operation on all downlink carriers by the UE.

In yet another aspect, DRX/DTX operations for the UE may be different for the two carriers on each link and may observe different timing. For DRX, the UE may have a first DRX configuration for the anchor downlink carrier and a second DRX configuration for the secondary downlink carrier. The UE may then have different DRX configurations for the two downlink carriers. The UE may receive data on each downlink carrier in the enabled downlink subframes for that downlink carrier. Decoupling the DRX operation on the two downlink carriers may allow the UE to conserve more battery power. The Node B may send a DRX order on a given downlink carrier to control DRX operation on that downlink carrier.

For DTX, the UE may have a first DTX configuration for the anchor uplink carrier and a second DTX configuration for the secondary uplink carrier (if present). The UE may then have different DRX configurations for the two uplink carriers. The UE may send data on each uplink carrier in the enabled uplink subframes for that uplink carrier. The Node B may send a DTX order to control DTX operation on each uplink carrier.

Figure 6:
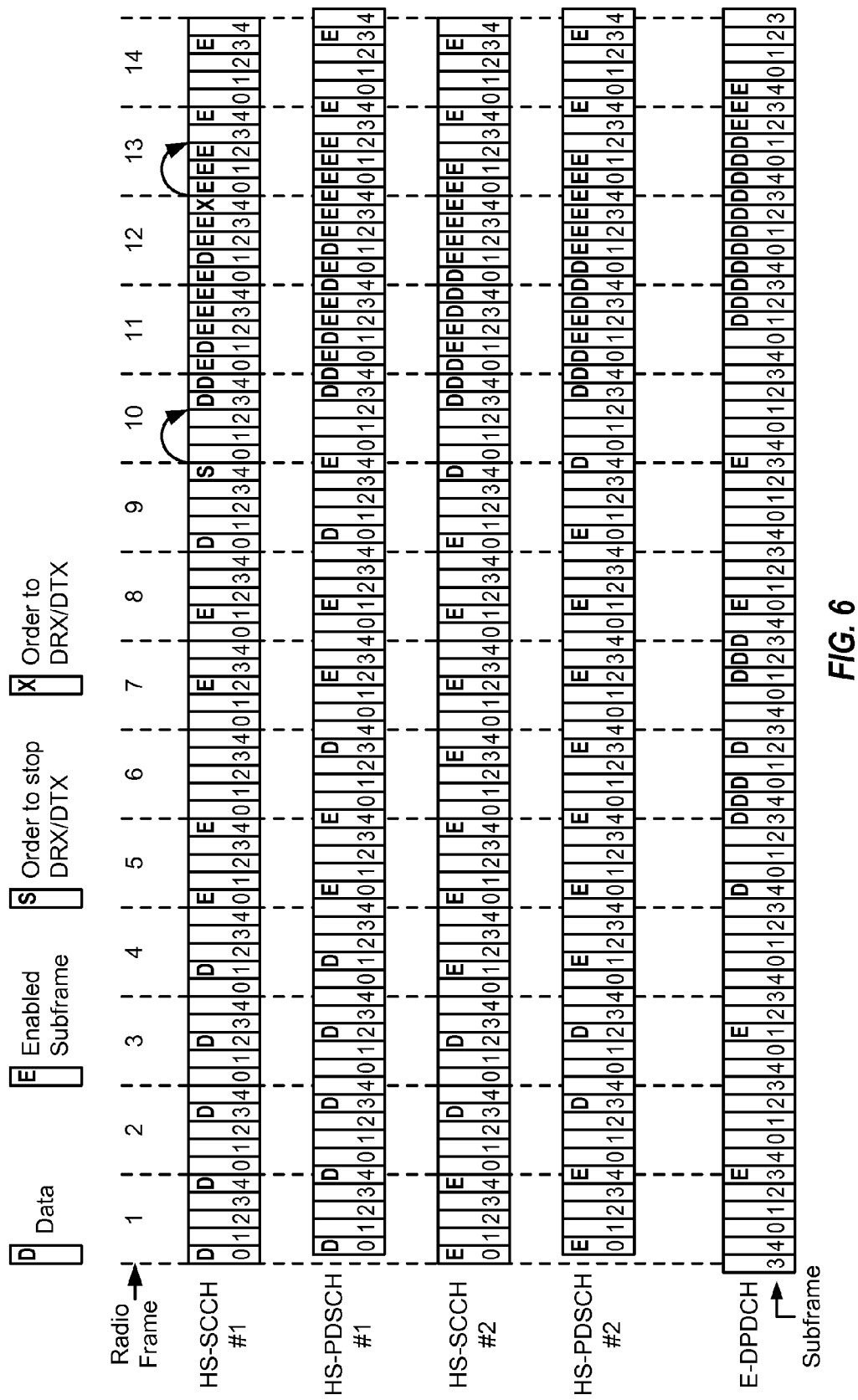
FIG. 6 shows use of HS-SCCH orders to control DRX/DTX operation.

FIG. 6 shows use of HS-SCCH orders to control DRX/DTX operation at the UE. FIG. 6 is for the case in which two downlink carriers and one uplink carrier are available for the UE. For DTX, the UE may be configured with the uplink DPCCH burst pattern shown in FIG. 4. For DRX, the UE may be configured with the HS-SCCH reception pattern shown in FIG. 4. The UE is in dual-carrier operation with the same DRX configuration for both downlink carriers. The anchor downlink carrier and the secondary downlink carrier have the same enabled downlink subframes.

In the example shown in FIG. 6, the Node B sends an HS-SCCH order to de-activate DRX/DTX operation (denoted as "S" or "Order to stop DRX/DTX") to the UE in subframe 4 of radio frame 9. Four subframes after sending this HS-SCCH order, all subframes on each downlink carrier are enabled and may be used to send data to the UE. The Node B sends an HS-SCCH order to activate DRX/DTX operation (denoted as "X" or "Order to DRX/DTX") to the UE in subframe 4 of radio frame 12. Four subframes after sending this HS-SCCH order, the enabled downlink subframes are determined by the HS-SCCH reception pattern, and the enabled uplink subframes are determined by the uplink DPCCH burst pattern.

Figure 7:
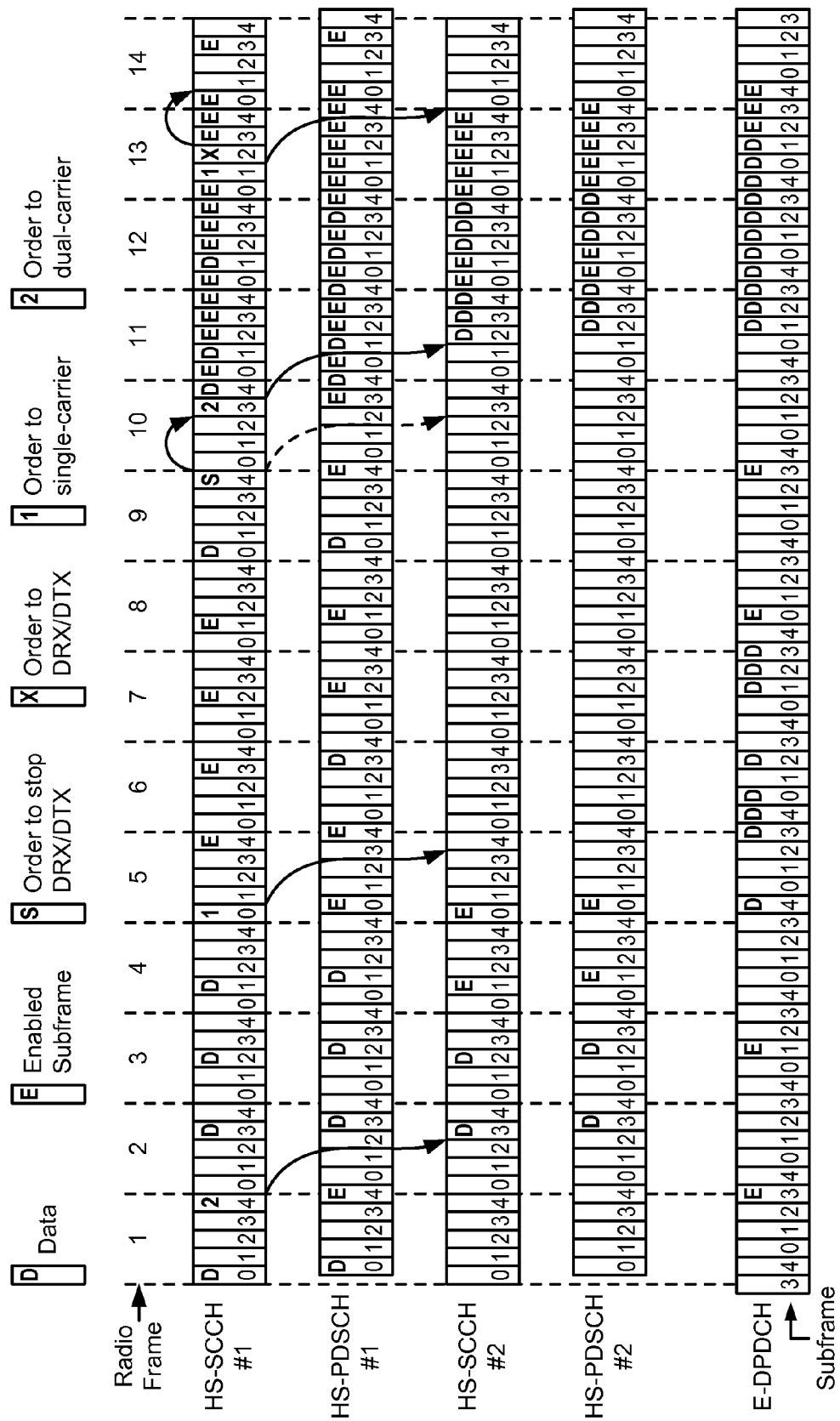
FIG. 7 shows use of HS-SCCH orders to control UE operation.

FIG. 7 shows use of HS-SCCH orders to control UE operation. FIG. 7 is for the case in which two downlink carriers and one uplink carrier are available for the UE. The secondary downlink carrier may be active only when HS-SCCH orders are sent by the Node B to activate this carrier. For DTX, the UE may be configured with the uplink DPCCH burst pattern shown in FIG. 4. For DRX, the UE may be configured with the HS-SCCH reception pattern shown in FIG. 4.

In the example shown in FIG. 7, the Node B sends HS-SCCH orders to activate the secondary downlink carrier and enable dual-carrier operation (denoted as "2" or "Order to dual-carrier" in FIG. 7) to the UE in subframe 4 of radio frame 1 and in subframe 3 of radio frame 10. After sending these HS-SCCH orders, the Node B can send data to the UE on the secondary downlink carrier in subsequent enabled downlink subframes while dual-carrier operation is enabled at the UE. The Node B sends HS-SCCH orders to de-activate the secondary downlink carrier and enable single-carrier operation (denoted as "1" or "Order to single-carrier" in FIG. 7) to the UE in subframe 0 of radio frame 5 and in subframe 1 of radio frame 13. After sending these HS-SCCH orders, the Node B can send data to the UE on only the anchor downlink carrier in subsequent enabled downlink subframes while single-carrier operation is enabled at the UE.

In the example shown in FIG. 7, the Node B sends an HS-SCCH order to de-activate DRX/DTX operation in subframe 4 of radio frame 9. Four subframes after sending this HS-SCCH order, all subframes on each activated downlink carrier are enabled and may be used to send data to the UE. The Node B sends an HS-SCCH order to activate DRX/DTX operation in subframe 2 of radio frame 13. Four subframes after sending this HS-SCCH order, the enabled downlink subframes are determined by the HS-SCCH reception pattern, and the enabled uplink subframes are determined by the uplink DPCCH burst pattern.

As shown in FIG. 7, when the UE is in single-carrier operation and DRX is activated, a first HS-SCCH order may be sent to de-activate DRX/DTX operation, and a second HS-SCCH order may be sent four subframes later to activate the secondary downlink carrier. There may be a delay of eight subframes from the time the first HS-SCCH order is sent (e.g., in subframe 4 of radio frame 9) to the time that data can be sent on the secondary downlink carrier (e.g., in subframe 2 of radio frame 11). This delay may be reduced by sending both an order to de-activate DRX and an order to activate the secondary downlink carrier in the same subframe. For example, if these two orders are sent in subframe 4 of radio frame 9, then the Node B can start sending data on the secondary downlink carrier starting in subframe 3 of radio frame 10, which is only four subframes later, as shown by the dashed line with a single arrow in FIG. 7.

FIG. 8 shows a design of an HS-SCCH order 800 that may be used to enable single-carrier or dual-carrier operation and to activate or de-activate DRX/DTX. HS-SCCH order 800 may be sent on the HS-SCCH and may include a 3-bit order type field, a 3-bit order field, a 16-bit UE identity field, and possibly other fields. The order type field may be set to a predetermined value (e.g., '000') to indicate that the HS-SCCH order is for enabling single-carrier or dual-carrier operation and for activating or de-activating DRX/DTX. The order field may include three bits $x_{ord,1}$, $x_{ord,2}$ and $x_{ord,3}$, which may be defined as follows:

DRX activation bit (e.g., $x_{ord,1}$): set to '0' to de-activate DRX or to '1' to activate DRX, DTX activation bit (e.g., $x_{ord,2}$): set to '0' to de-activate DTX or to '1' to activate DTX, and DC-HSDPA activation bit (e.g., $x_{ord,3}$): set to '0' to de-activate the secondary downlink carrier or to '1' to activate the secondary downlink carrier.

The DC-HSDPA activation bit may also activate or de-activate the secondary uplink carrier, if present.

The HS-SCCH order for activating/de-activating the secondary carrier(s) and activating/de-activating DRX/DTX may also be defined on other manners. Separate HS-SCCH orders may also be used for activating/de-activating the secondary carrier(s) and activating/de-activating DRX/DTX.

For normal operation in HSDPA, the Node B may send data on the HS-PDSCH to the UE and may send signaling on the HS-SCCH two slots prior to the data, as shown in FIG. 4. The signaling may convey various parameters such as the spreading codes and the coding and modulation schemes used to send the data. The UE may receive the signaling on the HS-SCCH and may process the HS-PDSCH in accordance with the signaling to recover the data sent to the UE.

3GPP supports HS-SCCH-less operation for data transmission on the downlink. For HS-SCCH-less operation, the Node B may assign pertinent transmission parameters to the UE, e.g., during call setup. The Node B may send the assigned parameters to the UE via upper layer signaling or by some other means. Thereafter, the Node B may send data on the HS-PDSCH to the UE without sending signaling on the HS-SCCH. The UE may process the HS-PDSCH in accordance with the assigned parameters to recover any data sent to the UE. HS-SCCH-less operation may reduce the amount of signaling on the downlink, which may improve system capacity.

In yet another aspect, HS-SCCH-less operation may be restricted to the anchor downlink carrier in DC-HSDPA. The Node B may send data on the HS-PDSCH on the anchor downlink carrier to the UE and may send no signaling on the HS-SCCH on this downlink carrier. Limiting HS-SCCH-less operation to the anchor downlink carrier may simplify operation of the Node B and the UE, which may communicate on the anchor downlink carrier for other purposes. This may also conserve battery power for the UE, which would not need to process the secondary downlink carrier for data sent with HS-SCCH-less operation.

An HS-SCCH order may be used to activate or de-activate HS-SCCH-less operation. The HS-SCCH order may include an HS-SCCH-less operation activation bit, which may be set to '0' to de-activate HS-SCCH-less operation or to '1' to activate HS-SCCH-less operation.

In general, a DRX activation bit, a DTX activation bit, a DC-HSDPA activation bit, and an HS-SCCH-less operation activation bit may be used to activate or de-activate DRX, DTX, DC-HSDPA, and HS-SCCH-less operation, respectively. These four activation bits may be sent in one or more HS-SCCH orders, depending on the capacity of each HS-SCCH order. If an HS-SCCH order can carry up to three activation bits, then in one design, the DRX, DTX, and DC-HSDPA activation bits may be sent in one HS-SCCH order, and the HS-SCCH-less operation activation bit may be sent in another HS-SCCH order, as described above. In another design, the DRX, DTX, and HS-SCCH-less operation activation bits may be sent in one HS-SCCH order, and the DC-HSDPA activation bit may be sent in another HS-SCCH order. The four activation bits may also be sent in HS-SCCH orders in other manners.

Dynamic carrier management in DC-HSDPA and its interaction with CPC may be achieved as described above. HS-SCCH orders may be used to transition the UE between single-carrier and dual-carrier operation. DRX operation may be the same on both downlink carriers, and DTX operation may be the same on both uplink carriers, which may simplify operation and provide other benefits. DTX orders may be sent on either downlink carrier or may be restricted to the anchor downlink carrier. HS-SCCH-less operation may be restricted to the anchor downlink carrier. HS-SCCH orders may be used to activate or de-activate DRX, DTX, DC-HSDPA and HS-SCCH-less operation, as described above. DRX, DTX, DC-HSDPA and HS-SCCH-less operation may also be activated or de-activated with other mechanisms, e.g., RRC messages at upper layer, some other signaling at lower layer, etc.

For clarity, much of the description herein covers two downlink carriers and one or two uplink carriers. In general, the techniques described herein may be used for any number of downlink carriers and any number of uplink carriers. If more than two carriers are available for a given link, then an HS-SCCH order may be applicable to all carriers or a subset of the carriers, e.g., a pair of carriers.

FIG. 9 shows an exemplary design of a process 900 for supporting multi-carrier operation. Process 900 may be performed by an entity, which may be UE 110, Node B 120, or some other entity. The entity may exchange (e.g., send or receive) a lower layer order to activate or de-activate a secondary carrier for the UE (block 912). The lower layer order may be an HS-SCCH order in WCDMA or some other lower layer signaling. In one design, the entity may be the UE. For block 912, the UE may receive the lower layer order sent by the Node B to the UE to activate or de-activate the secondary carrier. In another design, the entity may be the Node B. For block 912, the Node B may send the lower layer order to the UE to activate or de-activate the secondary carrier.

In one design, the entity may determine whether to activate or de-activate the secondary carrier based on available transmit power at the UE. For example, the secondary carrier may be de-activated if the UE has insufficient transmit power and is power limited. In another design, the entity may determine whether to activate or de-activate the secondary carrier based on data activity at the UE. The entity may also activate or de-activate the secondary carrier based on other factors, as described above.

The entity may communicate (e.g., transmit or receive data and/or signaling) on only an anchor carrier if the lower layer order de-activates the secondary carrier (block 914). The entity may communicate on the anchor carrier and the secondary carrier if the lower layer order activates the secondary carrier (block 916). The anchor carrier and the secondary carrier may be for the downlink, or the uplink, or for both links. More than one secondary carrier may also be available. In this case, the lower layer order may activate or de-activate all or a subset of the secondary carriers.

The lower layer order may activate the secondary carrier in block 912. In one design, the Node B may send another lower layer order to the UE to de-activate the secondary carrier if inactivity is detected. In another design, the Node B and the UE may each maintain an inactivity timer and may autonomously de-activate the secondary carrier after a particular inactivity time has elapsed, without the need to send another lower layer order for de-activation.

The entity may exchange a second HS-SCCH order to activate or de-activate HS-SCCH-less operation at the UE. The entity may thereafter exchange data without signaling if the second HS-SCCH order activates HS-SCCH-less operation, which may be restricted to the anchor carrier.

FIG. 10 shows an exemplary design of a process 1000 for supporting DRX/DTX operation. Process 1000 may be performed by an entity, which may be UE 110, Node B 120, or some other network entity. The entity may communicate (e.g., transmit or receive data and/or signaling) on an anchor downlink carrier in accordance with a DRX configuration for the UE (block 1012). The entity may communicate on a secondary downlink carrier in accordance with the DRX configuration for the UE (block 1014). The anchor and secondary downlink carriers may have common downlink subframes in which data can be sent by the Node B to the UE.

In one design, the entity may be the Node B. The Node B may send a lower layer order (e.g., an HS-SCCH order) to the UE to activate or de-activate DRX operation on the anchor and secondary downlink carriers. In another design, the entity may be the UE. The UE may receive a lower layer order (e.g., an HS-SCCH order) sent by the Node B to activate or de-activate DRX operation on the anchor and secondary downlink carriers. In one design, the lower layer order may be sent via the anchor downlink carrier or the secondary downlink carrier. In another design, the lower layer order may be restricted to the anchor downlink carrier.

In one design, the entity may communicate on an anchor uplink carrier in accordance with a DTX configuration for the UE (block 1016). The entity may communicate on a secondary uplink carrier in accordance with the DTX configuration for the UE (block 1018). The anchor and secondary uplink carriers may have common uplink subframes in which data can be sent by the UE to the Node B.

In another design, the entity may communicate on an uplink carrier in accordance with a DTX configuration for the UE. The entity may exchange a lower layer order on the anchor downlink carrier or the secondary downlink carrier to activate or de-activate DTX operation on the uplink carrier. Alternatively, the entity may be restricted to exchange the lower layer order on the anchor downlink carrier to activate or de-activate DTX operation.

In one design, the entity may communicate on only the anchor downlink carrier if the secondary downlink carrier is de-activated. The entity may communicate on the both downlink carriers if the secondary downlink carrier is activated. In one design, the entity may exchange a single lower layer order (e.g., one HS-SCCH order) to activate or de-activate DRX operation and to activate or de-activate the secondary downlink carrier. In another design, the entity may exchange one lower layer order to activate or de-activate DRX operation and may exchange another lower layer order to activate or de-activate the secondary downlink carrier.

Figure 11:
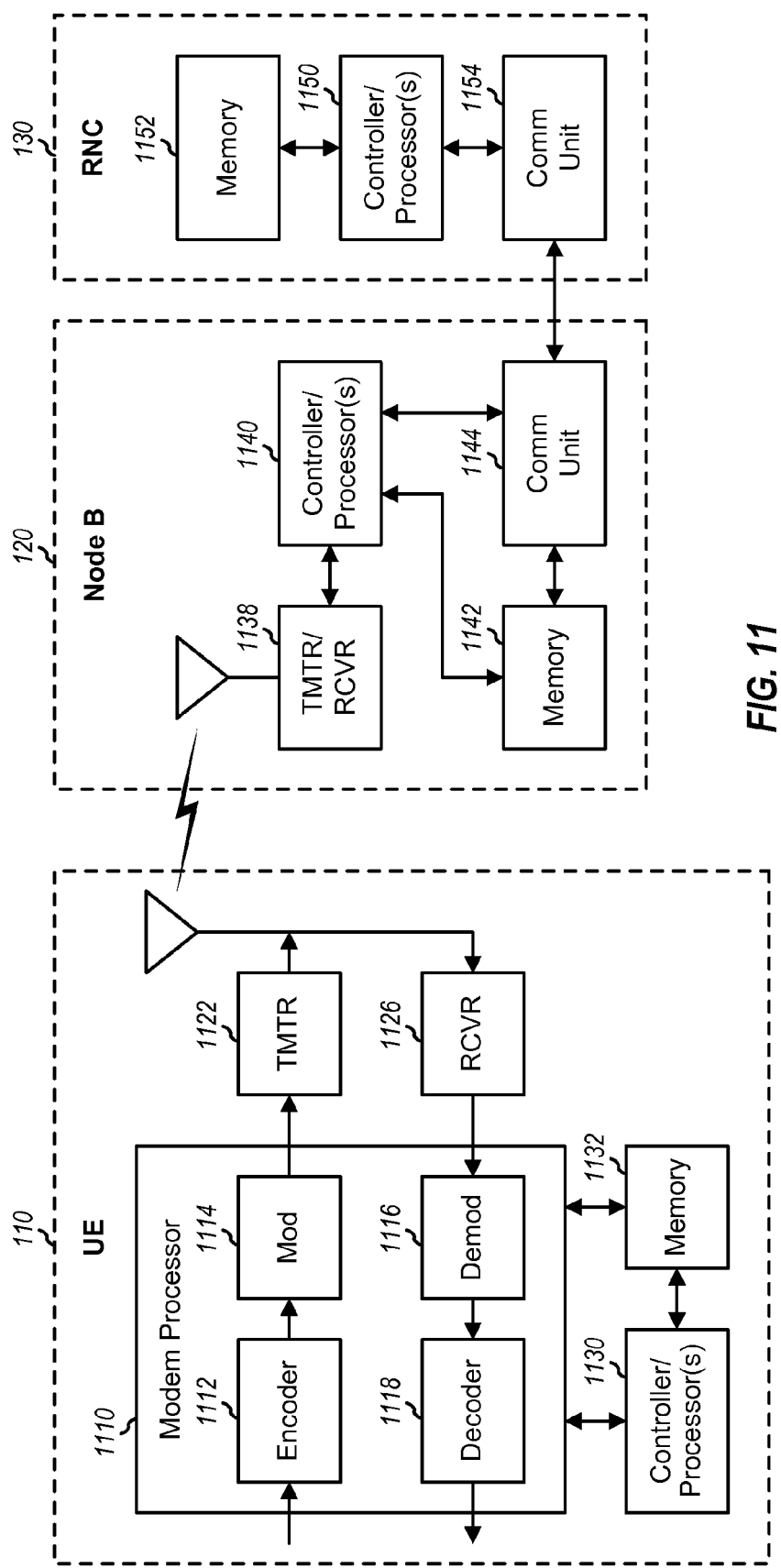
FIG. 11 shows a block diagram of a UE, a Node B, and an RNC.

FIG. 11 shows a block diagram of a design of UE 110, Node B 120, and RNC 130 in FIG. 1. At UE 110, an encoder 1112 may receive traffic data and messages to be sent by UE 110 on the uplink. Encoder 1112 may process (e.g., encode and interleave) the traffic data and messages. A modulator (Mod) 1114 may further process (e.g., modulate, channelize, and scramble) the encoded traffic data and messages and provide output samples. A transmitter (TMTR) 1122 may condition (e.g., convert to analog, filter, amplify, and frequency upconvert) the output samples and generate an uplink signal, which may be transmitted to Node B 120.

On the downlink, UE 110 may receive a downlink signal transmitted by Node B 120. A receiver (RCVR) 1126 may condition (e.g., filter, amplify, frequency downconvert, and digitize) a received signal and provide input samples. A demodulator (Demod) 1116 may process (e.g., descramble, channelize, and demodulate) the input samples and provide symbol estimates. A decoder 1118 may process (e.g., deinterleave and decode) the symbol estimates and provide decoded data and messages (e.g., HS-SCCH orders) sent to UE 110. Encoder 1112, modulator 1114, demodulator 1116 and decoder 1118 may be implemented by a modem processor 1110. These units may perform processing in accordance with the radio technology (e.g., WCDMA, etc.) used by the system. Controller/processor(s) 1130 may direct the operation at UE 110. Processor(s) 1130 and/or other units at UE 110 may perform or direct process 900 in FIG. 9, process 1000 in FIG. 10, and/or other processes for the techniques described herein. Memory 1132 may store program codes and data for UE 110.

At Node B 120, a transmitter/receiver 1138 may support radio communication for UE 110 and other UEs. Controller/processor(s) 1140 may perform various functions for communication with the UEs. On the uplink, the uplink signal from UE 110 may be received and conditioned by receiver 1138 and further processed by controller/processor(s) 1140 to recover the traffic data and messages sent by the UE. On the downlink, traffic data and messages (e.g., HS-SCCH orders) may be processed by controller/processor(s) 1140 and conditioned by transmitter 1138 to generate a downlink signal, which may be transmitted to UE 110 and other UEs. Processor(s) 1140 and/or other units at Node B 120 may perform or direct the process 900 in FIG. 9, process 1000 in FIG. 10, and/or other processes for the techniques described herein. Memory 1142 may store program codes and data for the Node B. A communication (Comm) unit 1144 may support communication with RNC 130 and/or other network entities.

At RNC 130, controller/processor(s) 1150 may perform various functions to support communication services for the UEs. Processor(s) 1150 and/or other units at RNC 130 may perform all or part of the process 900 in FIG. 9, process 1000 in FIG. 10, and/or other processes for the techniques described herein. Memory 1152 may store program codes and data for RNC 130. A communication unit 1154 may support communication with the Node Bs and other network entities.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
exchanging a lower layer order to activate or de-activate a secondary carrier for a user equipment (UE), wherein the lower layer order comprises a first Shared Control Channel for HS-DSCH (HS-SCCH) order sent by a Node B to the UE;
communicating on only an anchor carrier if the lower layer order de-activates the secondary carrier;
communicating on the anchor carrier and the secondary carrier if the lower layer order activates the secondary carrier;
exchanging a second HS-SCCH order to activate or de-activate HS-SCCH-less operation at the UE; and
exchanging data without signaling if the second HS-SCCH order activates HS-SCCH-less operation.

2. The method of claim 1, wherein the exchanging the lower layer order comprises receiving the lower layer order sent by a Node B to the UE to activate or de-activate the secondary carrier.

3. The method of claim 1, wherein the exchanging the lower layer order comprises sending the lower layer order from a Node B to the UE to activate or de-activate the secondary carrier.

4. The method of claim 1, wherein the second HS-SCCH order is exchanged subsequently to the first HS-SCCH order.

5. The method of claim 1, further comprising:
if the lower layer order activates the secondary carrier, de-activating the secondary carrier after a particular inactivity time has elapsed, without exchanging another lower layer order for de-activation.

6. The method of claim 1, wherein HS-SCCH-less operation is restricted to the anchor carrier.

7. The method of claim 1, further comprising:
determining whether to activate or de-activate the secondary carrier based on available transmit power at the UE.

8. The method of claim 1, further comprising:
determining whether to activate or de-activate the secondary carrier based on data activity at the UE.

9. An apparatus for wireless communication, comprising:
means for exchanging a lower layer order to activate or de-activate a secondary carrier for a user equipment (UE), wherein the lower layer order comprises a first Shared Control Channel for HS-DSCH (HS-SCCH) order sent by a Node B to the UE;
means for communicating on only an anchor carrier if the lower layer order de-activates the secondary carrier;
means for communicating on the anchor carrier and the secondary carrier if the lower layer order activates the secondary carrier
means for exchanging a second HS-SCCH order to activate or de-activate HS-SCCH-less operation at the UE; and
means for exchanging data without signaling if the second HS-SCCH order activates HS-SCCH-less operation.

10. The apparatus of claim 9, wherein the means for exchanging the lower layer order comprises means for sending the lower layer order from a Node B to the UE to activate or de-activate the secondary carrier.

11. The apparatus of claim 9, wherein the means for exchanging the lower layer order comprises means for receiving the lower layer order sent by a Node B to the UE to activate or de-activate the secondary carrier.

12. An apparatus for wireless communication, comprising:
at least one processor configured to exchange a lower layer order to activate or de-activate a secondary carrier for a user equipment (UE), wherein the lower layer order comprises a first Shared Control Channel for HS-DSCH (HS-SCCH) order sent by a Node B to the UE, to communicate on only an anchor carrier if the lower layer order de-activates the secondary carrier, to communicate on the anchor carrier and the secondary carrier if the lower layer order activates the secondary carrier, to exchange a second HS-SCCH order to activate or de-activate HS-SCCH-less operation at the UE, and to exchange data without signaling if the second HS-SCCH order activates HS-SCCH-less operation.

13. The apparatus of claim 12, wherein the at least one processor is configured to receive the lower layer order sent by a Node B to the UE to activate or de-activate the secondary carrier.

14. The apparatus of claim 12, wherein the at least one processor is configured to send the lower layer order from a Node B to the UE to activate or de-activate the secondary carrier.

15. A non-transitory computer-readable medium comprising:
code for causing at least one computer to exchange a lower layer order to activate or de-activate a secondary carrier for a user equipment (UE), wherein the lower layer order comprises a first Shared Control Channel for HS-DSCH (HS-SCCH) order sent by a Node B to the UE;
code for causing the at least one computer to communicate on only an anchor carrier if the lower layer order de-activates the secondary carrier;
code for causing the at least one computer to communicate on the anchor carrier and the secondary carrier if the lower layer order activates the secondary carrier;
code for exchanging a second HS-SCCH order to activate or de-activate HS-SCCH-less operation at the UE; and
code for exchanging data without signaling if the second HS-SCCH order activates HS-SCCH-less operation.

16. A method for wireless communication, comprising:
exchanging a lower layer order via a secondary downlink carrier to activate or de-activate discontinuous reception (DRX) operation on both the secondary downlink carrier and an anchor downlink carrier;
communicating on the anchor downlink carrier in accordance with a DRX configuration for a user equipment (UE); and
communicating on the secondary downlink carrier in accordance with the same DRX configuration for the UE, the anchor downlink carrier and the secondary downlink carrier having common subframes in which data can be sent by a Node B to the UE.

17. The method of claim 16, wherein exchanging the lower layer order comprises sending a lower layer order from the Node B to the UE to activate or de-activate DRX operation on the anchor downlink carrier and the secondary downlink carrier.

18. The method of claim 16, wherein exchanging the lower layer order comprises receiving a lower layer order sent by the Node B to the UE to activate or de-activate DRX operation on the anchor downlink carrier and the secondary downlink carrier.

19. The method of claim 16, wherein exchanging the lower layer order comprises exchanging a Shared Control Channel for HS-DSCH (HS-SCCH) order to activate or de-activate DRX operation on the anchor downlink carrier and the secondary downlink carrier.

20. The method of claim 16, further comprising:
exchanging a second lower layer order via the anchor downlink carrier to activate or de-activate DRX operation on the anchor downlink carrier and the secondary downlink carrier.

21. The method of claim 16, further comprising:
communicating on an uplink carrier in accordance with a discontinuous transmission (DTX) configuration for the UE.

22. The method of claim 21, further comprising:
exchanging a lower layer order on the anchor downlink carrier or the secondary downlink carrier to activate or de-activate DTX operation on the uplink carrier.

23. The method of claim 21, further comprising:
exchanging a lower layer order on only the anchor downlink carrier to activate or de-activate DTX operation on the uplink carrier.

24. The method of claim 16, further comprising:
communicating on an anchor uplink carrier in accordance with a discontinuous transmission (DTX) configuration for the UE; and
communicating on a secondary uplink carrier in accordance with the DTX configuration for the UE, the anchor uplink carrier and the secondary uplink carrier having common subframes in which data can be sent by the UE to the Node B.

25. The method of claim 16, further comprising:
communicating on only the anchor downlink carrier if the secondary downlink carrier is de-activated; and
communicating on the anchor downlink carrier and the secondary downlink carrier if the secondary downlink carrier is activated.

26. The method of claim 25, further comprising:
exchanging a single lower layer order to activate or de-activate DRX operation and to activate or de-activate the secondary downlink carrier.

27. An apparatus for wireless communication, comprising:
means for exchanging a lower layer order via a secondary downlink carrier to activate or de-activate discontinuous reception (DRX) operation on both the secondary downlink carrier and an anchor downlink carrier;
means for communicating on the anchor downlink carrier in accordance with a DRX configuration for a user equipment (UE); and
means for communicating on the secondary downlink carrier in accordance with the same DRX configuration for the UE, the anchor downlink carrier and the secondary downlink carrier having common subframes in which data can be sent by a Node B to the UE.

28. The apparatus of claim 27, further comprising:
means for communicating on an uplink carrier in accordance with a discontinuous transmission (DTX) configuration for the UE.

29. The apparatus of claim 27, further comprising:
means for communicating on an anchor uplink carrier in accordance with a discontinuous transmission (DTX) configuration for the UE; and
means for communicating on a secondary uplink carrier in accordance with the DTX configuration for the UE, the anchor uplink carrier and the secondary uplink carrier having common subframes in which data can be sent by the UE to the Node B.

30. The apparatus of claim 27, further comprising:
means for communicating on only the anchor downlink carrier if the secondary downlink carrier is de-activated; and
means for communicating on the anchor downlink carrier and the secondary downlink carrier if the secondary downlink carrier is activated.

* * * * *